(12) United States Patent
Nakamura et al.

(10) Patent No.: US 6,192,679 B1
(45) Date of Patent: Feb. 27, 2001

(54) EXHAUST PURIFICATION DEVICE AND METHOD FOR INTERNAL COMBUSTION ENGINE

(75) Inventors: Takeshi Nakamura; Ritsuo Sato; Kimiyoshi Nishizawa, all of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/304,835

(22) Filed: May 5, 1999

(30) Foreign Application Priority Data

May 29, 1998 (JP) .................................................. 10-149899
Jan. 29, 1999 (JP) .................................................. 11-022792

(51) Int. Cl.[7] ...................................................... F01N 3/00
(52) U.S. Cl. ............................... 60/297; 60/274; 60/299; 422/171; 422/177
(58) Field of Search .......................... 60/297, 299, 301, 60/274, 311, 320, 322; 422/169, 171, 177, 180

(56) References Cited

U.S. PATENT DOCUMENTS

| | | | |
|---|---|---|---|
| 5,398,503 | * | 3/1995 | Danno et al. ............................ 60/288 |
| 5,501,073 | * | 3/1996 | Miyashita et al. ...................... 60/284 |
| 5,538,697 | * | 7/1996 | Abe et al. .............................. 422/171 |
| 5,606,857 | * | 3/1997 | Harada ..................................... 60/322 |
| 5,649,421 | | 7/1997 | Wakabayashi et al. . |
| 5,722,363 | * | 3/1998 | Iida et al. .............................. 123/305 |
| 5,804,148 | * | 9/1998 | Kanesaka et al. .................... 422/174 |
| 6,047,544 | * | 4/2000 | Yamamoto et al. ................... 60/285 |

FOREIGN PATENT DOCUMENTS 5-57148   3/1993  (JP) .

\* cited by examiner

Primary Examiner—Thomas Denion
Assistant Examiner—Binh Tran
(74) Attorney, Agent, or Firm—Foley & Lardner

(57) ABSTRACT

A first and second converter are connected via an exhaust passage so that the first converter is situated further upstream relative to the flow of exhaust. These converters comprise an adsorbent which adsorbs hydrocarbons at a temperature lower than a first temperature and discharges hydrocarbons at a temperature higher than the first temperature, and a catalyst which oxidizes hydrocarbons when a second temperature higher than the first temperature is exceeded. The heat capacity of the exhaust passage is set so that the temperature of the adsorbent of the second converter does not reach the first temperature before the catalyst of the first converter reaches the second temperature. By repeating this hydrocarbon adsorption/oxidation, the hydrocarbon discharge amount is reduced especially during a cold start of the engine.

13 Claims, 5 Drawing Sheets

EXHAUST PURIFICATION DEVICE AND METHOD FOR INTERNAL COMBUSTION ENGINE

FIELD OF THE INVENTION

This invention relates to purification of discharged hydrocarbons (HC) from an internal combustion engine.

BACKGROUND OF THE INVENTION

Tokkai Hei 5-57148 published by the Japanese Patent Office in 1993 regarding the purification of hydrocarbon (HC) in the exhaust of an internal combustion engine, discloses an arrangement wherein plural catalytic converters comprising hydrocarbon adsorbents (HC adsorbents) and catalysts which oxidize hydrocarbons are disposed in series in an exhaust passage of an engine. The HC adsorbents absorb hydrocarbons when the temperature is low, and discharge the hydrocarbons when the temperature is high. The catalyst is activated when the temperature rises, and then oxidizes the hydrocarbons.

When the catalyst activation temperature is higher than the temperature at which HC adsorbent starts to discharge hydrocarbons, a specific region will be created where hydrocarbons released from the HC adsorbent are not oxidized.

As the converter temperature generally decreases the further away the converter is from the engine, the HC adsorbent of the downstream converters will still not have reached the HC discharge start temperature even if the upstream converters reaches the aforesaid specific temperature region.

Therefore, hydrocarbons flowing out of the upstream converter are adsorbed by the HC adsorbent of the downstream converters.

In this case, during the interval from when the temperature of the converter situated furthest downstream reaches the aforesaid specific temperature region to when it rises above the specific temperature region, hydrocarbons will be discharged into the atmosphere.

However, the discharge amount is less than the discharge amount of hydrocarbons discharged by the upstream converter discharges, and the amount of hydrocarbons which is finally discharged is less the larger the number of converters connected in series.

SUMMARY OF THE INVENTION

In the aforesaid prior art, if the HC adsorbent of the downstream converter reaches a temperature at which hydrocarbons are no longer adsorbed before the HC adsorbent of the upstream converter has finished discharging hydrocarbons, the hydrocarbons discharged by the upstream converter thereafter cannot be adsorbed by the HC adsorbent of the downstream converter.

In such a case, even if plural converters are used, a temporary increase in the discharge amount of hydrocarbons cannot be avoided.

It is therefore an object of this invention to suppress the discharge amount of hydrocarbons across the whole range of temperature increase of an exhaust passage due to engine warmup.

In order to achieve the above object, this invention provides an exhaust purifying device, comprising a first and second converters respectively comprising a hydrocarbon adsorbent and a catalyst and an exhaust passage connecting the first and second converters.

The adsorbent adsorbs hydrocarbons at a temperature lower than a first temperature and discharging adsorbed hydrocarbons at a temperature higher than the first temperature. The catalyst oxidizes hydrocarbons discharged from the adsorbent at a temperature higher that a second temperature which is higher than the first temperature.

The exhaust passage connects the first and second converters such that the first converters are situated further upstream than the second converters with respect to the flow of exhaust, The heat capacity of the exhaust passage is set so that the temperature of the absorbent of the second converter does not reach the first temperature before the temperature of the catalyst of the first converter rises to the second temperature.

This invention also provides an exhaust purifying method of an engine. The method comprises disposing a first and second converters in an exhaust passage of the engine such that the first converters are situated further upstream than the second converters with respect to the flow of exhaust of the engine. The converters respectively comprises a hydrocarbon adsorbent adsorbing hydrocarbons at a temperature lower than a first temperature and discharging adsorbed hydrocarbons at a temperature higher than the first temperature and a catalyst oxidizing hydrocarbons discharged from the adsorbent at a temperature higher that a second temperature which is higher than the first temperature. The method also comprises setting the heat capacity of the exhaust passage so that the temperature of the absorbent of the second converter does not reach the first temperature before the temperature of the catalyst of the first converter rises to the second temperature.

The details as well as other features and advantages of this invention are set forth in the remainder of the specification and are shown in the accompanying drawings.

DESCRIPTION OF THE PREFERRED EMBODIMENTS

Figure 1:
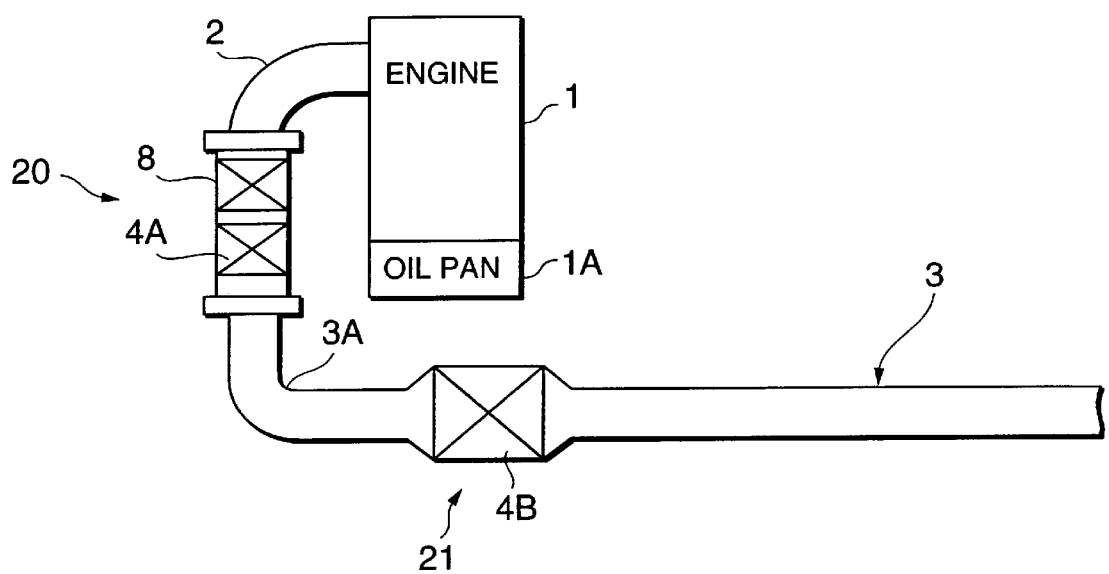
FIG. 1 is a schematic diagram of an exhaust purification device according to a first embodiment of this invention.

Referring to FIG. 1 of the drawings, a vehicle engine 1 comprises an oil pan 1A and exhaust manifold 2.

The exhaust manifold 2 is connected to an exhaust pipe 3 via a converter 20.

A separate converter 21 is interposed midway in the exhaust pipe 3.

A three-way catalyst 8 and hydrocarbon (HC) adsorbent 4A comprising a coating layer of hydrocarbon (HC) adsorbent are housed in series with respect to the flow of exhaust in a converter 21. An HC adsorbent 4B identical to the HC adsorbent 4A is housed in the converter 20.

Figure 4:
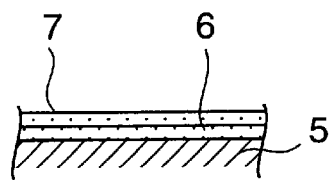
FIG. 4 is a partial sectional view of a catalyst according to this invention.

The HC adsorbents 4A, 4B comprise a coating of a layer 6 for adsorbing HC on the surface of a vanadium support 5, this being coated with a three-way catalyst layer 7 as shown in FIG. 4.

The adsorbent layer 6 and three-way catalyst layer 7 are coated for example by the method disclosed in Tokkai Hei 5-57148. A converter 20 housing the HC adsorbent 4A is arranged immediately after the exhaust manifold 2 at a high exhaust temperature. A converter 21 housing the HC adsorbent 4B is disposed midway in the exhaust gas pipe 3 in a substantially horizontal direction pointing in a direction from the engine room to the rear of a vehicle, and situated under an oil pan 1A of the engine 1 which has good high temperature retention characteristics.

The heat capacity of a part 3A of the exhaust gas pipe 3 situated between the converters 20, 21 is set so that the temperature of the HC adsorbent 4B does not exceed an upper limiting temperature at which HC can be adsorbed until discharge of HC by the adsorbent 4A is complete. As the temperature of the exhaust passage 3 has not increased much before warming up of the engine 1 is complete, the three-way catalyst 8 and three-way catalyst layer 7 of the HC adsorbents 4A, 4B are not activated. Therefore, in this stage, purification by oxidation of hydrocarbons (HC) in the exhaust cannot be expected to occur.

However, all the hydrocarbons (HC) which have passed through the three-way catalyst 8 are effectively adsorbed by the HC adsorbents 4A, 4B.

Figure 5:
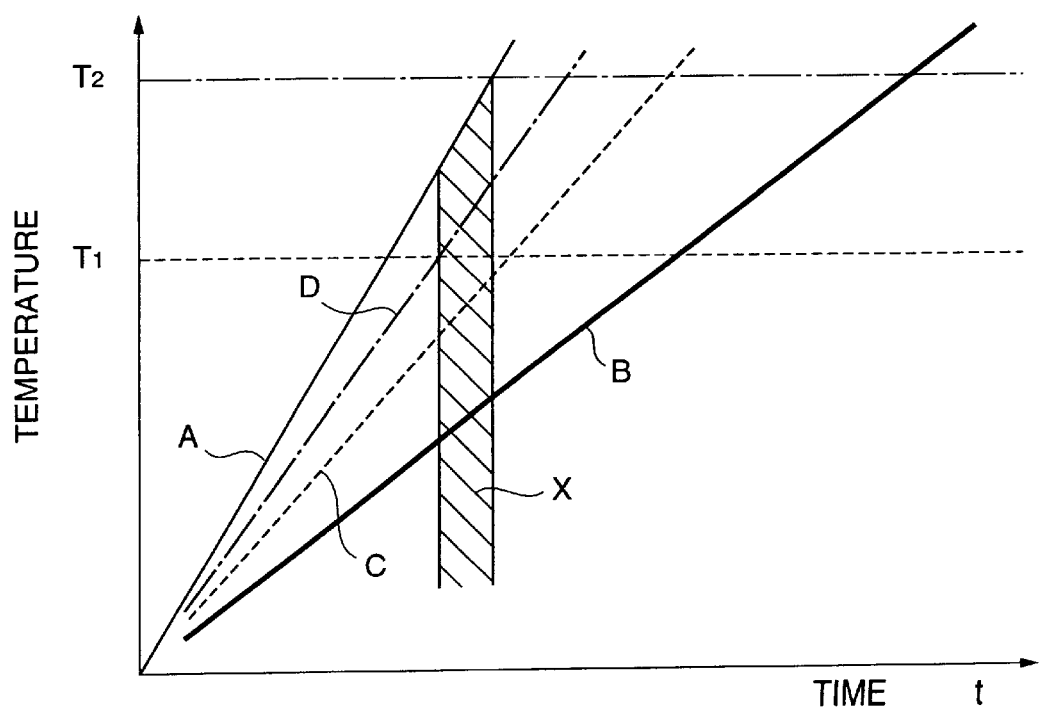
FIG. 5 is a diagram showing temperature rise characteristics of a converter according to the first embodiment of this invention.

When a certain time has elapsed after engine startup, the temperature of the HC adsorbent 4A rises as shown by the line A in FIG. 5, and eventually exceeds an HC adsorption upper limiting temperature $T_1$.

Subsequently, the adsorbent layer 6 of the HC adsorbent 4A stops adsorbing hydrocarbons (HC), and discharge of adsorbed hydrocarbons (HC) begins.

On the other hand, when the temperature of the HC adsorbent 4A exceeds a catalyst activation temperature $T_2$, hydrocarbons discharged by the HC adsorbent 4A are oxidized by the upper three-way catalyst layer 7 to become water vapor and carbon dioxide.

While the temperature of the HC adsorbent 4A is increasing from $T_1$ to $T_2$, the three-way catalyst layer 7 is not activated, so hydrocarbons (HC) discharged from the HC adsorbent 4A flow into the downstream converter 21 without being oxidized. At that time, if the HC adsorbent 4B of the converter 21 has not reached the upper limiting temperature $T_1$ at which adsorption is possible, the hydrocarbons flowing into the converter 21 are adsorbed by the HC adsorbent 4B.

However, if the temperature of the HC adsorbent 4B exceeds the upper limiting temperature at which adsorption is possible before the HC adsorbent 4A has reached the catalyst activation temperature $T_2$ as shown by the line D of FIG. 5, a time zone is created where the hydrocarbons flowing into the converter 21 are discharged without being adsorbed or oxidized as shown by the region X of the figure.

To deal with this problem, in this purification device, the temperature rise characteristics of the HC adsorbent 4B of the converter 22 are set as shown by the line B in FIG. 5. This is achieved by setting the heat capacity of the part 3A of the exhaust pipe 3 situated between the converters 20, 21 as described hereabove.

As a result, even when the temperature of the HC adsorbent 4A of the converter 20 becomes equal to or greater than the upper limiting temperature $T_1$ and is lower than the catalyst activation temperature $T_2$, the HC adsorbent 4B of the converter 21 has not reached the upper limiting temperature $T_1$ at which HC adsorption is possible, so the whole amount of hydrocarbons flowing into the converter 21 is adsorbed by the HC adsorbent 4B.

In the converter 21, the temperature of the HC adsorbent 4B eventually reaches the upper limiting temperature at which HC adsorption is possible, and discharge of adsorbed hydrocarbons begins. At the stage when the catalyst activation temperature $T_2$ is exceeded, these hydrocarbons are oxidized by the three-way catalyst 7.

In the converter 21, as in the case of the converter 20, during the interval when the temperature of the HC adsorbent 4B increases from $T_1$ to $T_2$, a time zone is created where hydrocarbons temporarily cannot be processed. However, as this is a two-stage processing, the discharge amount of hydrocarbons from the converter 21 in this time zone is less than the inflow amount of hydrocarbons to the converter 20.

In the HC adsorbents 4A, 4B, the adsorbent layer 6 is coated on the surface of the carrier 5, and the three-way catalyst layer 7 is coated on the absorbent layer 6. In the temperature region at and above the catalyst activation temperature $T_2$, hydrocarbons released from the adsorbent layer 6 which is the underlayer are oxidized by the three-way catalyst layer 7 which is the upper layer, and a good purification efficiency is obtained.

According to experiments performed by the inventors, it was found that when the upper limiting temperature $T_1$ of HC adsorption is 200° C. and the catalyst activation temperature $T_2$ is 270° C. in the above device, when the heat capacity of the part 3A of the exhaust pipe 3 is set to 80 cal/°C., the temperature of the HC adsorbent 4B reaches the upper limiting temperature $T_1$ at which HC can be adsorbed when the HC adsorbent 4A reached the catalyst activation temperature $T_2$. This corresponds to the line C of FIG. 5.

Also, in the case of the exhaust pipe 3 of an ordinary vehicle engine, the heat capacity of the part 3A is 80 cal/°C. when the length of the part 3A is set to approximately 180 mm.

Therefore, the effect of this invention is generally achieved by setting the length of the part 3A to 180 mm or more.

Figure 2:
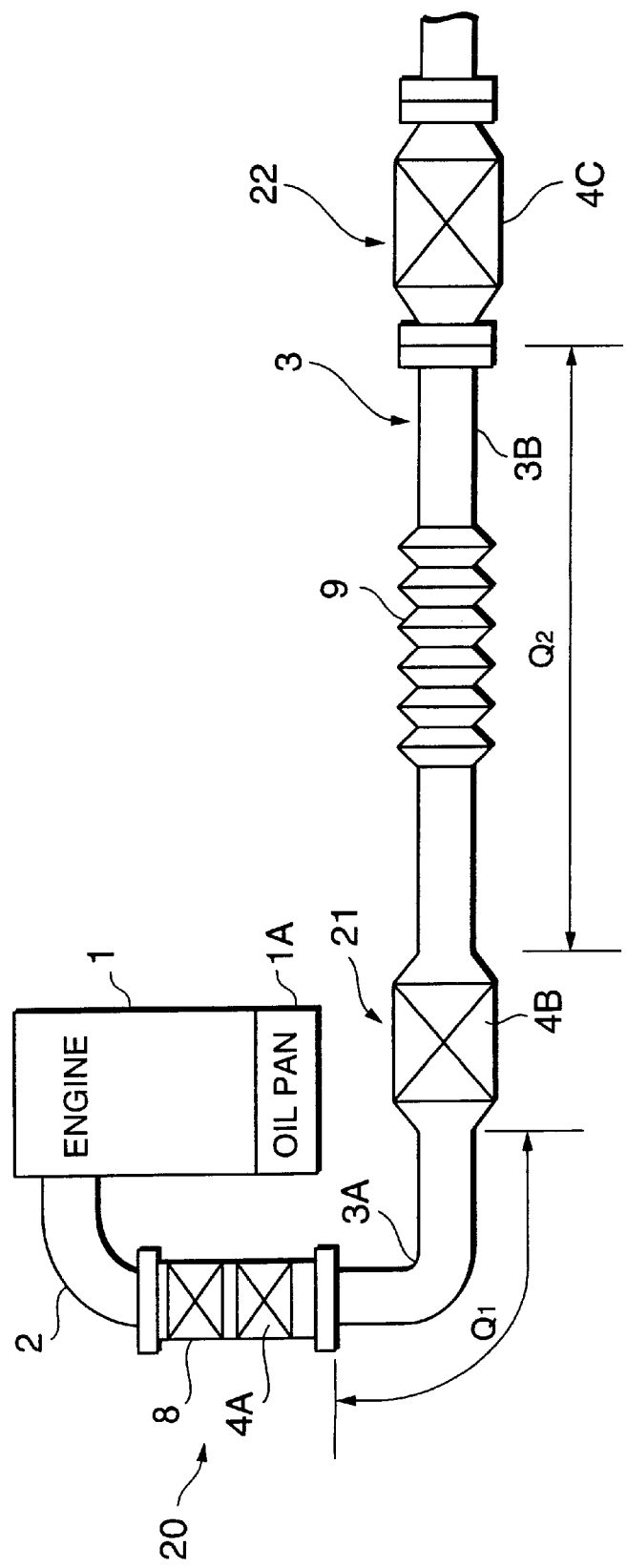
FIG. 2 is a schematic diagram of an exhaust purification device according to according to a second embodiment of this invention.

Next, a second embodiment of the invention will be described referring to FIG. 2.

According to this embodiment, a converter 22 is provided in the exhaust pipe 3 downstream of the converter 21 of the first embodiment. This converter 22 is installed in a part underneath the floor of the vehicle. An HC adsorbent 4C comprising an adsorbent layer 6 and a catalyst layer 7 similar to those of the HC adsorbents 4A, 4B is housed in the converter 22.

A heat capacity $Q_2$ of a part 3B of the exhaust pipe 3 between the HC adsorbents 4B, 4C is set larger than a heat capacity $Q_1$ of the part 3A between the HC adsorbents 4A, 4B.

This is accomplished by setting the length of the part 3B to be longer than that of the part 3A.

However, the heat capacity can be increased without lengthening the part 3B if a cornice 9 is provided as shown in the figure.

Figure 6:
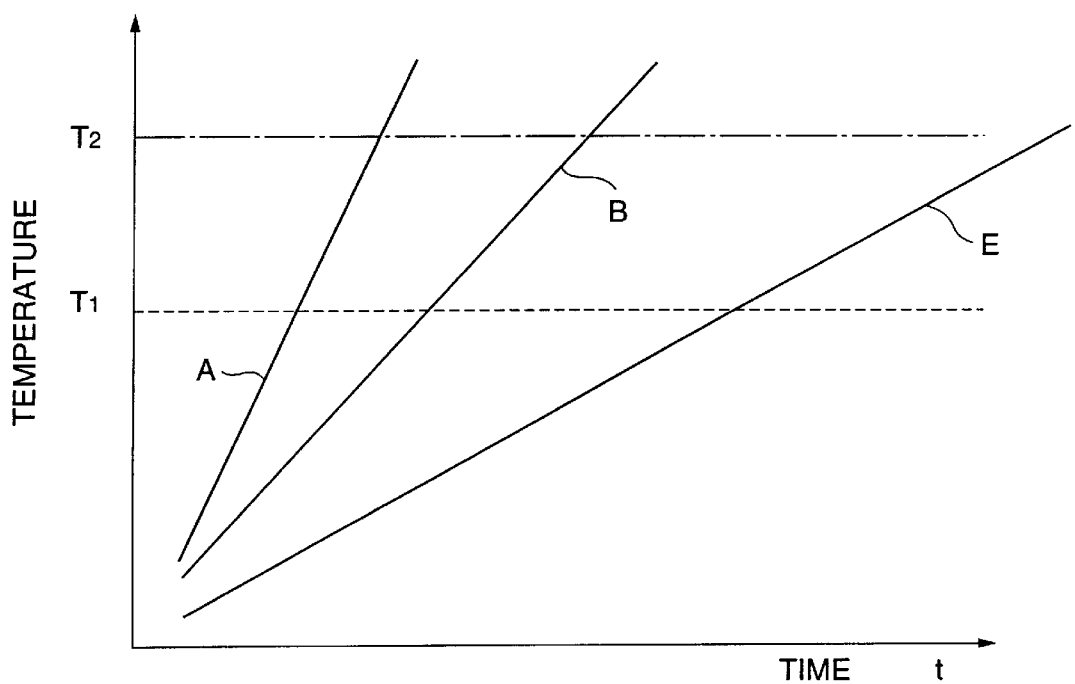
FIG. 6 is a diagram showing temperature rise characteristics of a converter according to the second embodiment of this invention.

The heat capacity $Q_2$ of the part 3B is set so that the HC adsorbent 4C does not exceed the upper limiting temperature at which HC is adsorbed before the HC adsorbent 4B reaches the catalyst activation temperature $T_2$, i.e. so that the temperature increase characteristics shown by the line E in FIG. 6 are obtained.

According to this embodiment, there is one more hydrocarbon adsorption, discharge and oxidation process than in the aforesaid first embodiment, so a higher hydrocarbon processing performance is obtained.

Figure 3:
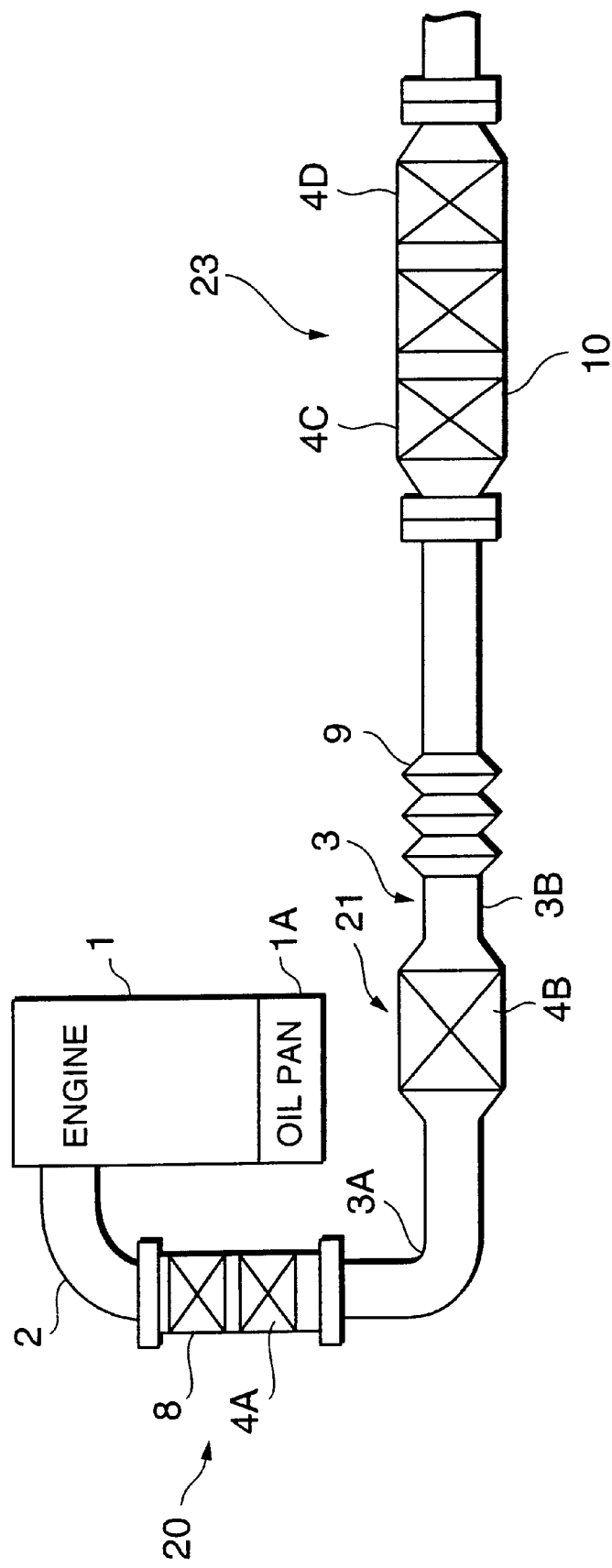
FIG. 3 is a schematic diagram of an exhaust purification device according to a third embodiment of this invention.

Next, a third embodiment of this invention will be described referring to FIG. 3.

In this embodiment, a converter 23 of different internal construction is used instead of the converter 22 of the aforesaid second embodiment.

The converter 22 housed only the HC adsorbent 4C, but the converter 23 comprises a three-way catalyst 10 downstream of the HC adsorbent 4C, and an HC adsorbent 4D situated still further downstream.

The construction of the three-way catalyst 10 is identical to that of the three-way catalyst 8, and the construction of the adsorbent 4D is identical to that of the adsorbent 4C.

The three-way catalyst 10 functions as an exhaust passage between the HC adsorbents 4C, 4D. In other words, the temperature increase characteristics of the HC adsorbent 4D is determined by the heat capacity of the three-way catalyst 10.

The heat capacity of the three-way catalyst 10 is determined so that the temperature of the HC adsorbent 4D does not exceed the upper limiting temperature $T_1$ at which HC can be adsorbed before the HC adsorbent 4C reaches the catalyst activation temperature $T_2$.

Due to this setting, the distance between the HC adsorbents 4C, 4D can be set shorter than when the passage is formed by a pipe or cornice.

According to this embodiment, there is one more hydrocarbon adsorption, discharge and oxidation process than in the aforesaid second embodiment, so an even higher hydrocarbon processing performance is obtained than in the aforesaid second embodiment.

In the aforesaid embodiments, in any of the aforesaid converters, part of the hydrocarbons (HC) discharged by the adsorbent layer of the HC adsorbent is oxidized by the three-way catalyst layer and part is discharged from the converter without being oxidized after the temperature of the HC adsorbent has reached the upper limiting temperature $T_1$ at which HC can be adsorbed.

In other words, the chance of oxidizing hydrocarbons (HC) increases the larger the number of converters, and the amount of hydrocarbons becomes less each time the exhaust gas passes through a converter.

As a result, the volume of HC adsorbent can be reduced further downstream, which also reduces the weight and cost of the exhaust purification device.

The contents of Tokugan Hei 10-149899 with a filing date of May 29, 1998 in Japan, and Tokugan Hei 11-22792 with a filing date of Jan. 29, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the volume of HC adsorbents is set to be constant, but the coating amount of HC adsorbent may be reduced further downstream.

The embodiments of this invention in which an exclusive property or privilege is claimed are defined as follows:

What is claimed is:

1. An exhaust purifying device, for purifying hydrocarbons in an exhaust of an internal combustion engine, the exhaust purifying device comprising:

first converter comprising a hydrocarbon adsorbent and a catalyst, a second converter comprising a hydrocarbon adsorbent and a catalyst said adsorbents adsorbing hydrocarbons at a temperature lower than a first temperature and discharging adsorbed hydrocarbons at a temperature higher than said first temperature, said catalysts oxidizing hydrocarbons discharged from said adsorbents at a temperature higher than a second temperature which is higher than said first temperature, and an exhaust passage connecting said first and second converters such that said first converter is situated further upstream than said second converter with respect to the flow of exhaust, said exhaust passage having a heat capacity that prevents said adsorbent of said second converter from reaching said first temperature before the temperature of said catalyst of said first converter rises to said second temperature.

2. An exhaust purifying device as defined in claim 1, wherein said internal combustion engine comprises an exhaust manifold for discharging exhaust, and said first converter is connected to said manifold.

3. An exhaust purifying device as defined in claim 1, wherein said engine comprises an oil pan, and said second converter is disposed under said oil pan.

4. An exhaust purifying device as defined in claim 1, wherein said adsorbents comprises a hydrocarbon adsorbent layer coated on a honeycomb support, and said catalysts comprise a catalyst layer coated on said hydrocarbon adsorbent layer.

5. An exhaust purifying device as defined in claim 4, wherein the coating amount of said hydrocarbon adsorbent layer of said second converter is set less than the coating amount of said hydrocarbon adsorbent layer of said first converter.

6. An exhaust purifying device as defined in claim 1, wherein said exhaust passage comprises a cornice.

7. An exhaust purifying device as defined in claim 1, wherein said exhaust passage comprises a three-way catalyst.

8. An exhaust purifying device as defined in claim 1, further comprising a third converter comprising a hydrocarbon adsorbent and a catalyst, said adsorbent adsorbing hydrocarbons at a temperature lower than said first temperature and discharging adsorbed hydrocarbons at a temperature higher than said first temperature, said catalyst oxidizing hydrocarbons at a temperature higher than said second temperature, and another exhaust passage for connecting said third converter downstream of said second converter, the heat capacity of said exhaust passage connecting said first and second converters is larger than the heat capacity of an exhaust passage connecting said second and third converters.

9. An exhaust purifying device as defined in claim 1, wherein the heat capacity of said exhaust passage is set to 80 cal/°C.

10. An exhaust purifying device as defined in claim 9, wherein said exhaust passage is a passage not shorter than 180 mm.

11. An exhaust purifying device as defined in claim 1, wherein the volume of said adsorbent of said second converter is set less than the volume of said adsorbent of said first converter.

12. An exhaust purifying device as defined in claim 1, wherein said first temperature is set to 200° C., and said second temperature is set to 270° C.

13. An exhaust purifying method of an engine, comprising:

disposing first and second converters in an exhaust passage of the engine such that said first converter is situated further upstream than said second converter with respect to the flow of exhaust of the engine, said first converter comprising a hydrocarbon adsorbent and a catalyst, said second converter comprising a hydrocarbon adsorbent and a catalyst, said adsorbents adsorbing hydrocarbons at a temperature lower than a first temperature and discharging the adsorbed hydrocarbons at a temperature higher than said first temperature, said catalysts oxidizing hydrocarbons discharged from said adsorbents at a temperature higher than a second temperature which is higher than said first temperature, and setting the heat capacity of said exhaust passage so that the temperature of said adsorbent of said second converter does not reach said first temperature before the temperature of said catalyst of said first converter rises to said second temperature.

* * * * *